US010308861B2

(12) United States Patent
Panamarathupalayam et al.

(10) Patent No.: US 10,308,861 B2
(45) Date of Patent: Jun. 4, 2019

(54) METHODS OF LOGGING

(71) Applicant: M-I L.L.C., Houston, TX (US)

(72) Inventors: Balakrishnan Panamarathupalayam, Houston, TX (US); Amr Essawi, Houston, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 15/400,438

(22) Filed: Jan. 6, 2017

(65) Prior Publication Data

US 2017/0199296 A1 Jul. 13, 2017

Related U.S. Application Data

(60) Provisional application No. 62/276,080, filed on Jan. 7, 2016.

(51) Int. Cl.
*C09K 8/52* (2006.01)
*E21B 37/00* (2006.01)
(Continued)

(52) U.S. Cl.
CPC .............. *C09K 8/52* (2013.01); *C08F 220/54* (2013.01); *C08F 220/56* (2013.01); *C09K 8/035* (2013.01);
(Continued)

(58) Field of Classification Search
CPC .......... E12B 43/10; E12B 43/82; E12B 43/25; G01V 3/24; G01V 3/34; G01V 3/20; C08F 220/54; C08F 220/56
See application file for complete search history.

(56) References Cited

U.S. PATENT DOCUMENTS

| 7,066,260 B2 | 6/2006 | Sullivan et al. |
| 8,835,364 B2 | 9/2014 | Thompson et al. |
| (Continued) | | |

FOREIGN PATENT DOCUMENTS

| CN | 102459501 A | 5/2012 |
| JP | 2015528032 A | 9/2015 |
| (Continued) | | |

OTHER PUBLICATIONS

International Search Report and Written Opinion issued in International Application No. PCT/US2017/012603 dated Apr. 13, 2017 (16 pages).

(Continued)

*Primary Examiner* — Tung X Nguyen
*Assistant Examiner* — Dominic E Hawkins
(74) *Attorney, Agent, or Firm* — David J. Smith

(57) ABSTRACT

A method of electrically logging a section of a wellbore includes circulating a wellbore fluid within the wellbore, the wellbore fluid including a base fluid; and a crosslinked and branched polymeric fluid loss control agent formed from at least an acrylamide monomer and a sulfonated anionic monomer; wherein the fluid loss control agent has an extent of crosslinking that is selected so that the fluid loss control agent has a viscosity that is within a peak viscosity response of the viscosity response curve; placing within the wellbore a wellbore logging tool capable of applying an electrical current to the wellbore; applying electrical current from the logging tool; and collecting an electrical log of the portion of the wellbore that has had electrical current applied thereto.

23 Claims, 2 Drawing Sheets

(51) Int. Cl.

| | | |
|---|---|---|
| *C09K 8/035* | (2006.01) | |
| *E21B 37/08* | (2006.01) | |
| *E21B 43/08* | (2006.01) | |
| *E21B 43/10* | (2006.01) | |
| *E21B 43/25* | (2006.01) | |
| *C08F 220/56* | (2006.01) | |
| *C09K 8/12* | (2006.01) | |
| *G01V 3/20* | (2006.01) | |
| *G01V 3/34* | (2006.01) | |
| *C08F 220/54* | (2006.01) | |
| *G01V 3/24* | (2006.01) | |
| *C09K 8/508* | (2006.01) | |
| *C09K 8/512* | (2006.01) | |
| *C08F 212/14* | (2006.01) | |
| *C08F 228/02* | (2006.01) | |

(52) U.S. Cl.
CPC .............. *C09K 8/12* (2013.01); *C09K 8/5083* (2013.01); *C09K 8/512* (2013.01); *E21B 37/00* (2013.01); *E21B 37/08* (2013.01); *E21B 43/082* (2013.01); *E21B 43/10* (2013.01); *E21B 43/25* (2013.01); *G01V 3/20* (2013.01); *G01V 3/24* (2013.01); *G01V 3/34* (2013.01); *C08F 212/14* (2013.01); *C08F 228/02* (2013.01); *C09K 2208/26* (2013.01)

(56) References Cited

U.S. PATENT DOCUMENTS

| | | | |
|---|---|---|---|
| 9,158,025 | B2 | 10/2015 | Forgang |
| 9,695,350 | B2* | 7/2017 | Chung .................. C09K 8/588 |
| 2001/0009889 | A1* | 7/2001 | Waggenspack ....... C08B 37/003 507/110 |
| 2008/0200354 | A1 | 8/2008 | Jones et al. |
| 2009/0114394 | A1 | 5/2009 | Javora et al. |
| 2009/0197781 | A1* | 8/2009 | Sunkara .................. C09K 8/28 507/221 |
| 2010/0063738 | A1* | 3/2010 | Roy ........................ E21B 49/08 702/7 |
| 2010/0163228 | A1 | 7/2010 | Abad et al. |
| 2010/0210482 | A1* | 8/2010 | Fox .......................... C09K 8/12 507/129 |
| 2011/0221883 | A1 | 9/2011 | Johnston |
| 2012/0018226 | A1* | 1/2012 | Nzeadibe ................. C09K 8/12 175/65 |
| 2012/0131996 | A1* | 5/2012 | Anish .................. E21B 17/1021 73/152.54 |
| 2013/0030707 | A1* | 1/2013 | Tabarovsky .......... E21B 47/102 702/11 |
| 2014/0121136 | A1 | 5/2014 | Mirakyan et al. |
| 2014/0131045 | A1* | 5/2014 | Loiseau ................ E21B 43/119 166/305.1 |
| 2015/0021027 | A1* | 1/2015 | Chapman ............... C09K 8/035 166/292 |
| 2015/0021098 | A1 | 1/2015 | Kippie |
| 2015/0101805 | A1 | 4/2015 | Svoboda et al. |
| 2015/0191640 | A1 | 7/2015 | Lee et al. |
| 2015/0204188 | A1* | 7/2015 | Massam ................ E21B 47/182 175/50 |
| 2015/0284619 | A1 | 10/2015 | Price Hoelscher et al. |
| 2016/0229936 | A1 | 8/2016 | Kumaki et al. |

FOREIGN PATENT DOCUMENTS

| | | |
|---|---|---|
| KP | 2014507487 A | 3/2014 |
| WO | 2005095755 A1 | 10/2005 |
| WO | 2015037672 A1 | 3/2015 |

OTHER PUBLICATIONS

International Search Report and Written Opinion issued in International Application No. PCT/US2017/012578 dated Apr. 24, 2017 (16 pages).
International Search Report and Written Opinion issued in International Application No. PCT/US2017/012574 dated Apr. 24, 2017 (14 pages).
Office Action dated Sep. 11, 2017, issued by the U.S. Patent and Trademark Office in related U.S. Appl. No. 15/400,354 (11 pages).
Office Action dated Mar. 8, 2018, issued by the U.S. Patent and Trademark Office in corresponding U.S. Appl. No. 15/400,354 (5 pages).

\* cited by examiner

METHODS OF LOGGING

CROSS-REFERENCE TO RELATED APPLICATIONS

This application claims priority to U.S. Patent Application No. 62/276,080 filed on Jan. 7, 2016, which is incorporated herein by reference.

BACKGROUND

In the process of rotary drilling a well, a wellbore fluid or mud is circulated down the rotating drill pipe, through the bit, and up the annular space between the pipe and the formation or steel casing, to the surface. The wellbore fluid performs many different functions. For example, it removes cuttings from the bottom of the hole to the surface, suspends cuttings and weighting material when the circulation is interrupted, controls subsurface pressure, isolates the fluids from the formation by providing sufficient hydrostatic pressure to prevent the ingress of formation fluids into the wellbore, cools and lubricates the drill string and bit, maximizes penetration rate, etc. An important objective in drilling a well is also to secure the maximum amount of information about the type of formations being penetrated and the type of fluids or gases in the formation. This information is obtained by analyzing the cuttings and by electrical logging technology and by the use of various downhole logging techniques, including electrical measurements.

Various logging and imaging operations are performed during or after the drilling operation, for example, they may be performed while drilling in the reservoir region of an oil/gas well in order to determine the type of formation and the material therein. Such information may be used to optimally locate the pay zone, i.e., where the reservoir is perforated in order to allow the inflow of hydrocarbons into the wellbore. The use of wireline well logs is well known in the art of drilling subterranean wells and in particular oil and gas wells. A wireline log is generated by lowering a logging tool down the well on a wireline. The tool is slowly brought back to the surface and the instruments on the logging tool take measurements that characterize the formation penetrated by the well in addition to other important properties of the well. For example, during logging wireline logs may use measurements of relative resistivity of the formation to determine the geological composition of the downhole formation. An alternative or supplement to wireline logging involves logging tools placed in a specialized drill collar housing and run in the drill string near the bit. This technique is known as logging-while-drilling (LWD) or formation-evaluation-while-drilling (FEWD). Measurements such as electrical resistivity may be thereby taken and stored downhole for later retrieval during a "tripping out" of the drill string, or transmitted to the surface via mud-pulse telemetry. Also, during drilling, such resistivity measurements may be useful to determine the location of the drill bit to enhance geosteering capabilities and directional drilling control, collected such as by a measurement while drilling (MWD) tool. Thus, electrical logs and other wireline log techniques are depended upon in the oil and gas exploration industry to determine the nature of the geology and the reservoir properties of the petroleum bearing formations penetrated by the well, as well as other properties of the drilling process (e.g., the location of the drill bit). Further, such well logs are often the only record of a formation penetrated by a well that are available for correlation amongst different wells in a particular field.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of electrically logging a section of a wellbore that includes circulating a wellbore fluid within the wellbore, the wellbore fluid including a base fluid; and a crosslinked and branched polymeric fluid loss control agent formed from at least an acrylamide monomer and a sulfonated anionic monomer; wherein the fluid loss control agent has an extent of crosslinking that is selected so that the fluid loss control agent has a viscosity that is within a peak viscosity response of the viscosity response curve; placing within the wellbore a wellbore logging tool capable of applying an electrical current to the wellbore; applying electrical current from the logging tool; and collecting an electrical log of the portion of the wellbore that has had electrical current applied thereto.

In another aspect, embodiments disclosed herein relate to a system for electrically logging a section of a wellbore that includes a wellbore containing a wellbore fluid, the wellbore fluid including a base fluid; and a crosslinked and branched polymeric fluid loss control agent formed from at least an acrylamide monomer and a sulfonated anionic monomer, wherein the fluid loss control agent has an extent of crosslinking that is selected so that the fluid loss control agent has a viscosity that is within a peak viscosity response of the viscosity response curve; and a wellbore logging tool capable of applying an electrical current to the wellbore.

In yet another aspect, embodiments disclosed herein relate to a method of electrically logging a section of a wellbore that includes circulating a wellbore fluid within the wellbore, wherein the wellbore fluid exhibits low end rheology that does not deviate by more than 30 percent under a temperature up to 300° F. when compared to low end rheology of the fluid at temperatures below about 250° F.; placing within the wellbore a wellbore logging tool capable of applying an electrical current to the wellbore; applying electrical current from the logging tool; and collecting an electrical log of the portion of the wellbore that has had electrical current applied thereto.

Other aspects and advantages of the claimed subject matter will be apparent from the following description and the appended claims.

DETAILED DESCRIPTION

Figure 1:
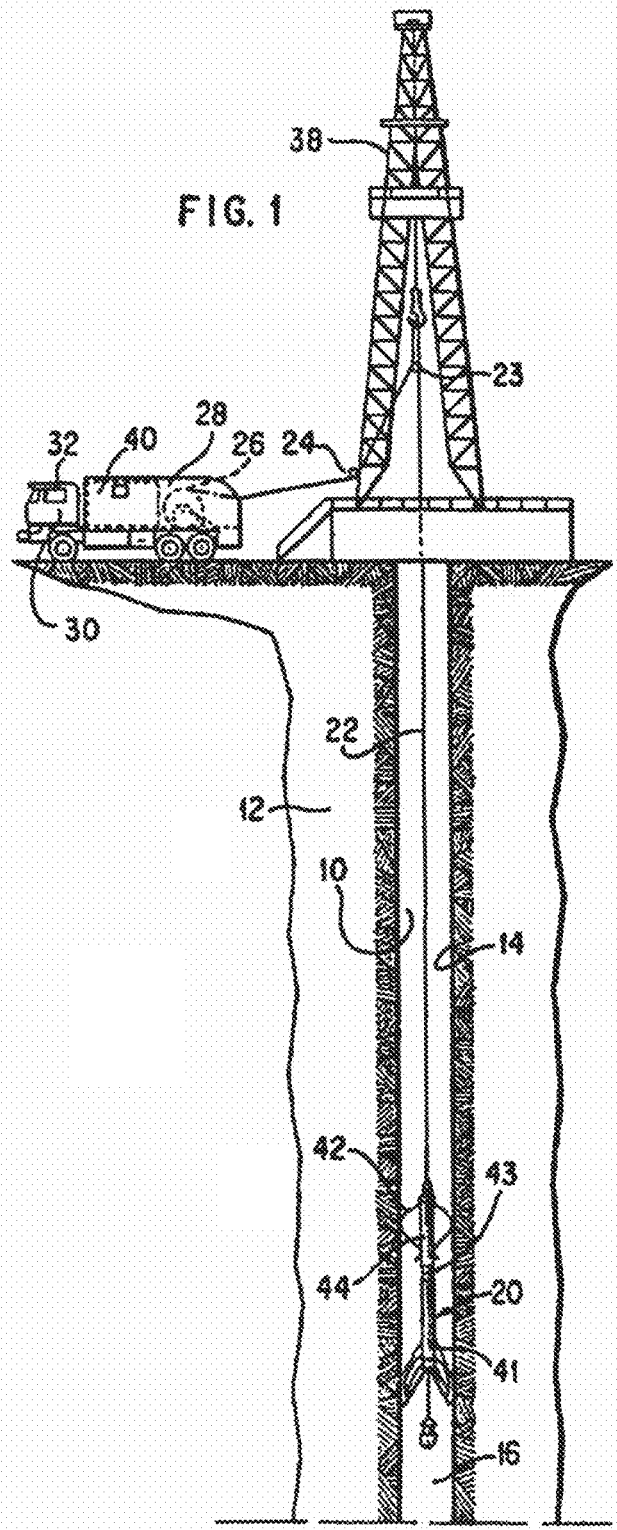
FIG. 1 shows a wellbore extending vertically into a formation with a resistivity logging tool located therein.

Embodiments disclosed herein generally relate to methods of using wellbore logging, and more specifically resistivity tools, to interrogate wellbores having a thermally stable water based wellbore fluid therein. In particular, one or more embodiments disclosed herein relate to methods of using resistivity tools to interrogate wellbores having conductive wellbore fluids therein, particularly reservoir drill-in-fluids (RDF) that include synthetic copolymeric fluid loss agents.

Reservoir drill-in-fluids are a specialty fluid having a limited amount of solids and often degradable polymeric additives and may be used when drilling through the reservoir section of a wellbore. Wellbore fluids in accordance with the present disclosure may contain polymeric fluid loss control additives that are capable of withstanding HTHP conditions, yet clean up with breaker fluids and be suitable for clean drilling and reservoir drill-in applications. During standard wellbore operation, wellbore fluids are often formulated with a number of polymeric additives to tune the viscosity and gel strength of the fluid such that wellbore fluids maintain the ability to suspend particulate additives and drill cuttings, particularly when circulation is stopped. Another function of the drilling fluid is its ability to seal permeable formations exposed by the bit with a low permeability filter cake. Seals are often by created by wellbore fluid additives such as polymers or bridging agents accumulating to form a filter cake on the walls of the wellbore.

However, rheological characteristics of wellbore fluids may be difficult to control because of the adverse conditions under which wellbore fluids are used, including high temperature, high shear (caused by the pumping and placement), high pressures, and low pH. For example, when drilling of certain deep wells, e.g., greater than 15,000 feet, or in geothermally active formations, temperatures may be such that thermal decomposition of certain drilling fluid additives occurs, which can cause detrimental changes in viscosity and flow characteristics that can negatively affect the overall drilling operation, not to mention any logging operations that may be done after drilling.

For example, if a wireline log is to be taken of a wellbore after it is drilled, the drill string must be tripped out of the wellbore before the wireline can be inserted. Tripping out the drill string can be a time consuming process and during this process the wellbore fluid present in the wellbore is subject to HTHP and static conditions. Under HTHP conditions, polymeric materials used to viscosity conventional wellbore fluids and provide a measure of fluid loss control may degrade, causing changes in the rheology of the fluid. Specifically, exposure to HTHP conditions can have a detrimental effect on viscosifying agents, resulting in a loss in viscosity of the fluid at high temperatures. A breakdown of the rheology can limit or eliminate the ability of the wellbore fluid to suspend solids entrained within it (such as weighting agents, bridging agents or drill cuttings) and may lead to settlement, loss in fluid density, possible blowout of the well, situations that could impede the collection of a wellbore log by wireline.

Specialized additives for HTHP conditions often contain polymeric materials that have exceptional resistance to extreme conditions, but can require specialized cleanup fluids to remove. For example, many cellulose and cellulose derivatives used as viscosifiers and fluid loss control agents degrade at temperatures around 200° F. and higher. Hydroxyethyl cellulose, on the other hand, is considered sufficiently stable to be used in an environment of no more than about 225° F. (107° C.). Likewise, because of the high temperature, high shear, high pressures, and low pH to which well fluids are exposed, xanthan gum is considered stable to be used in an environment of no more than about 290 to 300° F. (143 to 149° C.). However, the relative thermal stability of polymers such as xanthan gum may also contribute to decreased well productivity. As a result, expensive and often corrosive breaker fluids have been designed to disrupt filter cakes and residues left by these polymers, but beyond costs, the breakers may also result in incomplete removal and may be hazardous or ineffective under HTHP conditions.

In some embodiments, wellbore fluid additives in accordance with the present disclosure may also exhibit enhanced high temperature stability and cleanup properties, allowing for their use as brine viscosifiers and fluid loss additives in wellbore operations that may be sensitive to the amount of formation damage caused by standard drilling fluid additives. To this end, wellbore fluids in accordance with the present disclosure may be used in drilling (particularly the reservoir section) and/or to treat fluid loss in some embodiments, for example, by formulating a drilling fluid or fluid loss pill with a crosslinked fluid loss control additive. Further, advantages of wellbore fluids in accordance with the present disclosure are that they may retain their rheology and stability during the tripping out process required to remove the drill bit and complete a wireline log of the wellbore.

Wireline Logging

When an electrical wireline log is made of a well, electrodes on the well logging tool are conventionally in contact with the wellbore fluid or filtercake and hence the formation rocks through which the well has penetrated. An electrical circuit is created and the resistance and other electrical properties of the circuit may be measured while the logging tool is withdrawn from the well. In conventional wellbore logging, the measurement of resistivity requires the presence of a highly conductive path between the logging tool and the formation (i.e., through the wellbore fluid). The resulting data is a measure of the electrical properties of the drilled formations versus the depth of the well. The results of such measurements may be interpreted to determine the presence or absence of petroleum or gas, the porosity of the formation rock, and other important properties of the well. In one or more embodiments, the measurements once taken may be stored downhole with the wellbore tool that took them or they may be transmitted to the surface during their collection.

Referring now to FIG. 1, a schematic of a wellbore and tool that may be used in accordance with certain aspects of the present disclosure is shown. FIG. 1 shows a wellbore 10 extending vertically into a formation 12 with a resistivity logging tool 20 located therein. The wellbore 10 has a generally cylindrically shaped exposed wall 14 upon which a filtercake will form as a wellbore fluid permeates the formation 12 during a drilling or other wellbore formation. A wellbore fluid 16 may be present in the wellbore 10 during the logging of the wellbore.

The resistivity logging tool 20 may be suspended in the wellbore 10 by a pulling cable 22, which at its upper end extends around sheaves 23 and 24 to the spool 26 of a winch 28. The spool of the winch 28 can be rotated in either direction, to either raise or lower the tool 20, by operator control of an engine 30 in the winch-carrying vehicle 32. Sheave 23 is typically supported from a derrick frame 38 centered over the wellbore 10. On the winch-carrying vehicle 32 there is also located electronic apparatus 40, which permits control of the various operations during a logging run, as well as providing signal processing and storage of the signals from the tool 20.

The resistivity logging 20 tool itself may comprise a sonde 41 and an electronic cartridge 44, connected to each other by an articulated physical connection 43. Centering of the resistivity logging tool 20 in the wellbore 10 may be facilitated by bowed-spring centralizers 42, which may comprise four equiangularly spaced spring bow members extending radially outward towards the wellbore wall 14.

Figure 2:
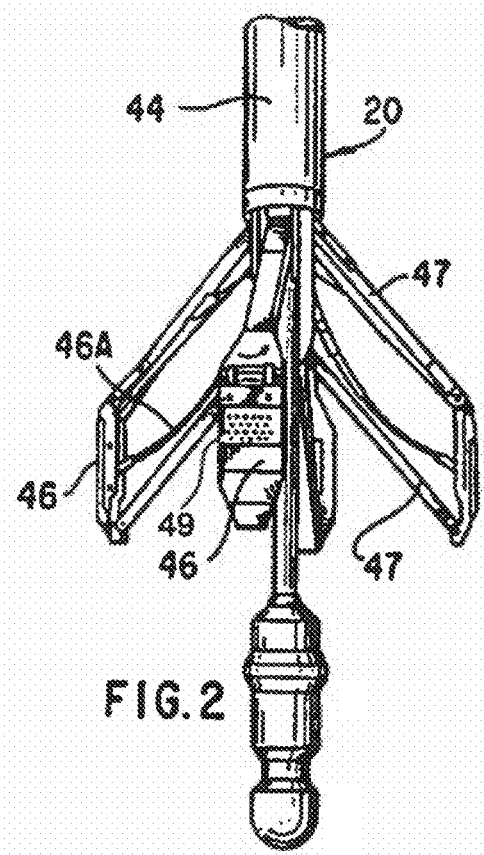
FIG. 2 shows an enlarged perspective view, partly in section, of a portion of the sonde of the resistivity tool.

Moving now to FIG. 2 which shows an enlarged perspective view, partly in section, showing more clearly a portion of the sonde 41 of the resistivity tool 20. Four pads 46, each having an array of electrodes 49 thereon, are each mounted on a pair of supports 47, which urge the pads 46 outwardly against the wellbore wall 14, by spring action or hydraulic pressure in a manner known in resistivity measuring systems. The method for obtaining the desired resistivity measurements using such a system as described above is to use the array of electrodes 49 on the pads 46 to apply an alternating current through the formation to a return electrode, which may be the housing of the electronic cartridge 44. As the current emerges from the electrodes 49 on the pads 46, its path is initially focused on the small volume of formation 12 directly facing the respective electrodes 49 but expands rapidly, in a magnitude dependent upon the properties of the formation, through the wellbore wall 14 and across the formation between the electrodes 49 and the return electrode. These measurements occur continuously as the resistivity tool 20 is dragged upwardly in the wellbore 10 and are called microresistivity measurements because they measure the electrical resistivity of very small vertical segments of the wellbore wall 14 and formation 12 structure.

As will be understood by a skilled artisan, the resistivity tool shown in FIGS. 1 and 2 may be configured in a variety of ways and have a variety of different components. Its inclusion here is not meant to limit the scope of the application in any way and is only intended to represent the basics of the process of obtaining an electrical log or resistivity measurement in a wellbore. For example, similar equipment and techniques may be used to acquire electrical logs in highly deviated wellbores. Additionally, similar equipment and techniques may be used where the pads are not placed in contact with the formation and instead the measurement is taken by application of the current through the wellbore fluid itself.

Wellbore Fluids

Wellbore fluid formulations in accordance with the present disclosure may contain crosslinked polymeric fluid loss control agents that may include a copolymer formed from at least one acrylamide monomer and at least one sulfonated anionic monomer. In other embodiments, crosslinked and branched fluid loss control agents may also include higher order copolymers and block copolymers such as terpolymers, quaternary polymers, and the like, including at least one acrylamide monomer, at least one sulfonated anionic monomer, and optionally other monomers as well.

In one aspect, wellbore fluids of the present disclosure incorporate a crosslinked and branched polymeric fluid loss control agent that is formed from at least an acrylamide monomer and a sulfonated anionic monomer. In one or more embodiments, crosslinked and branched fluid loss control agents may include polymers and copolymers synthesized from a mixture of monomers that may include acrylamide-based monomers. Acrylamide-based monomers in accordance with the present disclosure may play a role in creating an effective and high temperature stable fluid loss control agents, enhancing the fluid's high temperature endurance. In addition to unsubstituted acrylamide monomers, acrylamide-based monomers may also include N-substituted acrylamides, such as alkylacrylamides, N-methylol, N-isopropyl, diacetone-acrylamide, N-alkyl acrylamide (where alkyl is $C_1$ to $C_{14}$), N,N-dialkyl acrylamides (where alkyl is $C_1$ to $C_{14}$), N-cycloalkane acrylamides, combinations of the above and related compounds.

The crosslinked fluid loss control agents may also contain one or more sulfonated anionic monomers. While not limited to a particular theory, incorporation of anionic monomers may increase stability when added to a copolymer by repelling negatively charged hydroxide ions that promote hydrolysis of the acrylamide moiety of the polymer. Sulfonated anionic monomers, such as 2-acrylamide-2-methyl-propanesulfonic acid (AMPS®), a trademark of the Lubrizol Corporation—also referred to as acrylamide tertiary butyl sulfonic acid (ATBS), vinyl sulfonate, styrene sulfonic acid, and the like, may provide tolerance to divalent cations such as calcium and magnesium encountered in drilling fluids. Thus, the incorporation of sulfonated anionic monomers may result in an improved thermally stable fluid loss control agent for divalent cation systems, including brine based drilling fluids. Depending upon the reactivity ratio and the end use of the polymer, other sulfonated monomers may also be utilized for preparing an effective fluid loss control agent.

Further, it is also within the scope of the present disclosure that other monomers can be incorporated into the crosslinked polymer composition depending upon the end use of the polymer or the type of aqueous base drilling fluid. For example, lipophilic monomers, such as isobornyl methacrylate, 2-ethyl hexyl acrylate, N-alkyl and N,N-dialkyl acrylamide, styrene and the like can be incorporated to improve the performance of the polymer in high brine containing drilling fluids. Also, to make it more tolerant to other electrolytes, anionic monomers, such as maleic acid, tetrahydrophthalic acid, fumaric acid, acrylic acid and the like can be incorporated into the crosslinked polymers.

In one or more embodiments, crosslinked fluid loss control agents may contain covalent intermolecular crosslinking depending on the desired functional characteristics of the polymer. In one or more embodiments, the extent of crosslinking may be selected to maximize the viscosity of the resulting polymer in solution. In one or more embodiments, a crosslinked fluid loss control agent may exhibit a bell-curve type response for its viscosity in solution as the quantity of crosslinker used to crosslink the co-polymer is increased. That is, the viscosity initially increases as the quantity of crosslinker (and thus the crosslinks) are increased until a peak viscosity is reached, at which point the viscosity decreases and eventually results in a substantially zero slope as the quantity of crosslinker is further increased. In one or more embodiments, the crosslinked fluid loss control agent used in the RDF may be synthesized with an amount of crosslinker, and thus extent of crosslinking, so that its viscosity response is in the higher viscosity region of the bell-curve described above. For example, in one or more embodiments, the extent of crosslinking in the crosslinked fluid loss control agent may be selected so that the viscosity of fluid loss control agent is within a peak viscosity response of the viscosity response curve (created by plotting viscosity as a function of crosslinker under otherwise constant conditions). In one or more embodiments, the peak viscosity response may be defined as the amount of crosslinker that correlates to the peak amount plus or minus the amount of crosslinker that correlates to up to 75% of the area under the viscosity response curve that terminates upon reaching substantially zero slope. In more particular embodiments, the amount of crosslinker may be that which correlates to within 50%, or in some embodiments 25%, of the area under the viscosity response curve.

In one or more embodiments, the peak viscosity response may be expressed as the the amount of crosslinker that correlates to the peak amount plus or minus the amount of crosslinker that correlates to 1.5 standard deviations from the peak amount. In more particular embodiments, the amount of crosslinker correlates to the peak amount plus or minus the amount of crosslinker that correlates to 1.0 standard deviations from the peak amount or from 0.5 standard deviations in even more particular embodiments. Further, in one or more embodiments, the peak viscosity response may be expressed as the amount of crosslinker that correlates to the peak amount plus or minus 50% of the peak amount. In more particular embodiments, the amount of crosslinker is the peak amount plus or minus 30% or 20% of the peak amount. Further, based on the above, one of ordinary skill in the art would appreciate that the breadth of the amount of crosslinker (and selection of amount of crosslinker) may depend, for example, on the shape of the viscosity response curve and the desired rheological properties for the wellbore fluid and its particular application.

Crosslinking may be achieved, for example, by incorporation of crosslinking monomers such as methylenebisacrylamide, divinyl benzene, allylmethacrylate, tetra allyloxethane or other allylic bifunctional monomers. The crosslinked fluid loss control agent may have a percentage of intermolecular crosslinking that ranges from 0.25% to 10% in some embodiments, from 0.5% to 5% in other embodiments, and from 0.75% to 2.5% in other embodiments.

Wellbore fluids of the present disclosure may also exhibit temperature stability up to 250° F. (121° C.) in some embodiments, or greater that 250° F. (121° C.) in other embodiments. For example, in one or more embodiments, wellbore fluids of the present disclosure may exhibit temperature stability up to 300° F., or up to 350° F., or up to 400° F., or up to 450° F. Temperature stability may be described herein as the ability of the fluid to maintain suitable rheology at the temperature indicated above for at least five days. In one or more embodiments, a wellbore fluid of the present disclosure may exhibit low end rheology (i.e., rheology at 3 and 6 rpm) that does not deviate by more than 30 percent under the elevated temperature conditions indicated above when compared to the low end rheology at temperatures below about 250° F. In one or more embodiments, the rheology at 3 rpm, when tested at 120° F., for fluids according to the present disclosure may be at least 5 under any of the temperature conditions described above. In one or more embodiments, crosslinked fluid loss control additives may be added to a wellbore fluid at a concentration that that ranges from a lower limit selected from the group of 0.5, 1, 2.5, and 3 lb/bbl, to an upper limit selected from the group of 5, 10, 12, and 15 lb/bbl, where the concentration may range from any lower limit to any upper limit. The amount needed will vary, of course, depending upon the type of wellbore fluid, contamination, and temperature conditions.

In one or more embodiments, the polymeric fluid loss control agent may have an average molecular weight that ranges from a lower limit selected from the group of 250, 500, and 1,000 Da, to an upper limit selected from the group of 100, 250, 500, and 1,000 kDa, where the molecular weight may range from any lower limit to any upper limit. As used herein, molecular weight refers to weight average molecular weight ($M_w$) unless indicated otherwise.

In one or more embodiments, crosslinked fluid loss control agents may be a copolymer having a ratio of acrylamide monomer and sulfonated anionic monomer that ranges from 0.5:1 to 10:1. In some embodiments, a ratio of acrylamide monomer and sulfonated anionic monomer may range from 1:1 to 5:1

Base Fluids

In one or more embodiments, crosslinked fluid loss control additives and/or crosslinked polyvinylpyrrolidones in accordance with the present disclosure may be hydrated by their simple addition to a base fluid. For example, the crosslinked fluid loss control additives may be hydrated by free water upon their addition to water or a brine used a base fluid. In one or more embodiments, the fluid of the present disclosure may have an aqueous base fluid, the fluid being a monophasic fluid, in which the above mentioned polymers are included. The aqueous medium of the present disclosure may be water or brine. In those embodiments of the disclosure where the aqueous medium is a brine, the brine is water comprising an inorganic salt or organic salt. The salt may serve to provide desired density to balance downhole formation pressures, and may also reduce the effect of the water based fluid on hydratable clays and shales encountered during drilling. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, zinc, potassium, strontium, and lithium, salts of chlorides, bromides, carbonates, iodides, chlorates, bromates, formates, nitrates, oxides, phosphates, sulfates, silicates, and fluorides. Salts that may be incorporated in a brine include any one or more of those present in natural seawater or any other organic or inorganic dissolved salts.

In some embodiments, the fluid may be a divalent halide is selected from the group of alkaline earth halides or zinc halides. The brine may also comprise an organic salt, such as sodium, potassium, or cesium formate. Inorganic divalent salts include calcium halides, such as calcium chloride or calcium bromide. Sodium bromide, potassium bromide, or cesium bromide may also be used. The salt may be chosen for compatibility reasons, i.e. where the reservoir drilling fluid used a particular brine phase and the completion/clean up fluid brine phase is chosen to have the same brine phase.

Additives

In one embodiment, the drilling fluid of the disclosure may further contain other additives and chemicals that are known to be commonly used in oilfield applications by those skilled in the art. A variety of additives can be included in the aqueous based drilling fluid of this disclosure with the purpose of formation of a thin, low permeability filter cake which seals pores and other openings in the formations which are penetrated by the bit. Such additives may include thinners, weighting material, gelling agents, shale inhibitors, pH butters, etc.

Wellbore fluids of the present disclosure may contain other materials needed to form complete drilling fluids. Such other materials optionally may include, for example: additives to reduce or control low temperature rheology or to provide thinning, additives for enhancing viscosity, additives for high temperature high pressure control, and emulsion stability.

Examples of wellbore fluid thinners that may be used include lignosulfonates, lignitic materials, modified ligno-sulfonates, polyphosphates and tannins. In other embodiments low molecular weight polyacrylates can also be added as thinners. Thinners are added to a drilling fluid in order to reduce flow resistance and gel development. Other functions performed by thinners include the reduction of filtration and cake thickness, to counteract the effects of salts, to minimize the effects of water on the formations drilled, to emulsify oil in water, and to stabilize mud properties at elevated temperatures.

The HTHP wellbore fluids of the present disclosure additionally include an optional weighting material, sometimes referred to as a weighting agent. The type and quantity of weighting material used may depend upon the desired density of the final drilling fluid composition. Weight materials include, but are not limited to: barite, iron oxide, calcium carbonate, magnesium carbonate, and combinations of such materials and derivatives of such materials. The weight material may be added in a quantity to result in a drilling fluid density of up to 24 pounds per gallon. In an embodiment, the particulate weighting agent may be composed of an acid soluble material such as calcium carbonate, magnesium carbonate, $Mn_3O_4$, etc.

The solid weighting agents may be of any particle size (and particle size distribution), but some embodiments may include weighting agents having a smaller particle size range than API grade weighing agents, which may generally be referred to as micronized weighting agents. Such weighting agents may generally be in the micron (or smaller) range, including submicron particles in the nanosized range. One of ordinary skill in the art would recognize that, depending on the sizing technique, the weighting agent may have a particle size distribution other than a monomodal distribution. That is, the weighting agent may have a particle size distribution that, in various embodiments, may be monomodal, which may or may not be Gaussian, bimodal, or polymodal.

In one or more embodiments, an amine stabilizer may be used as a pH buffer and/or thermal extender to prevent acid-catalyzed degradation of polymers present in the fluid. A suitable amine stabilizer may include triethanolamine; however, one skilled in the art would appreciate that other amine stabilizers such as methyldiethanol amine (MDEA), dimethylethanol amine (DMEA), diethanol amine (DEA), monoethanol amine (MEA), cyclic organic amines, sterically hindered amines, amides of fatty acid, or other suitable tertiary, secondary, and primary amines and ammonia could be used in the fluids of the present disclosure.

In some embodiments, the amine stabilizer may be commercially available amine stabilizers such as PTS-200, or polyether amines polyether amines such as the JEFFAMINE series of polyether amines including Jeffamine D-230, all of which are available from M-I L.L.C. (Houston, Tex.). Amine stabilizers may be added to a wellbore fluid in accordance with the present disclosure at a concentration that ranges from 0.1% to 10% by weight of the wellbore fluid in some embodiments, and from 0.5% to 5% by weight of the wellbore fluid in other embodiments. Further, is also envisioned that the fluid may be buffered to a desirable pH using, for example, magnesium oxide. The compound serves as to buffer the pH of the drilling fluid and thus maintain the alkaline conditions under which the process of hydrolysis or degradation of the polymers is retarded.

The fluids may be formulated or mixed according to various procedures; however, in particular embodiments, the polymeric fluid loss control agent of the present disclosure may be yielded in fresh water prior to be added to a brine (or vice versa). Thus, after the polymer yields in fresh water, a brine (such as a divalent halide) may be combined with the yielded polymer. The gelling agent may be added to the yielded polymer either before, after, or simultaneously with the brine.

Upon mixing, the fluids of the present embodiments may be used in drilling operations. Drilling techniques are known to persons skilled in the art and involve pumping a drilling fluid into a wellbore through an earthen formation. The fluids of the present embodiments have particular application for use in high temperature environments. The drilling fluid formulations disclosed herein may possess high thermal stability, having particular application for use in environments of up to 450° F. In yet another embodiment, the fluids of the present disclosure are thermally stable for at least 16 hours, or for at least two days, or for at least five days at the elevated temperatures indicated above.

One embodiment of the present disclosure involves a method of drilling a wellbore. In one such illustrative embodiment, the method involves pumping a drilling fluid into a wellbore during the drilling through a reservoir section of the wellbore, and then allowing filtration of the drilling fluid into the earthen formation to form a filter cake on the wellbore walls. The filter cake is partially removed afterwards, thus allowing initiation of the production of hydrocarbons from reservoir. The formation of such a filter cake is desired for drilling, particularly in unconsolidated formations with wellbore stability problems and high permeabilities. Further, in particular embodiments, the fluids of the present disclosure may be used to drill the reservoir section of the well, and the open hole well may be subsequently completed (such as with placement of a screen, gravel packing, etc.) with the filter cake remaining in place. After the completion equipment is installed, removal of the filter cake may be achieved through use of a breaker fluid (or internal breaking agent).

In one or more embodiments, the fluids of the present disclosure may also find utility in coiled tubing applications where the high temperature stability of the fluid could be useful. Coiled tubing applications use a long metal pipe that can be spooled on large reels in a variety of downhole operations including well interventions, production operations, and in some instances drilling. Many of the operations that use coiled tubing may also be done by wireline. However, coiled tubing has the advantage of being able to be pushed into the wellbore rather than the reliance on gravity with wireline and also fluids may be pumped through the coiled tubing. In embodiments where the fluids of the present disclosure are used in coiled tubing applications a lubricant may be added to the wellbore fluids to reduce friction although, the crosslinked fluid-loss control additive may effectively act as a friction reducer when used in coiled tubing applications.

EXAMPLES

Example 1—Tests of High Temperature Stability

In the following example, a wellbore fluid containing a branched and crosslinked AMPS acrylamide co-polymer was tested to determine its rheological properties and their stability at elevated temperatures. The wellbore fluid of Sample 1 was formulated as shown in Table 1. In Table 1, DEFOAM-X is a defoamer used for foam control and is available from MI-LLC (Houston, Tex.), ECF-1868 is a crosslinked AMPS acrylamide co-polymer available from M-I LLC (Houston, Tex.), SAFECARB is a calcium carbonate available from MI-LLC (Houston, Tex.) and is added to provide the fluid with bridging solids, MgO is added to act as a pH buffer for the fluid.

TABLE 1

Formulation of Sample 1

| Additives | Concentration |
|---|---|
| 14.2 ppg CaBr$_2$ brine | 0.57 bbl/bbl |
| Water | 0.28 bbl/bbl |
| DEFOAM-X | 0.35 ppb |
| ECF-1868 | 9.0 ppb |
| Dry CaBr$_2$ | 55.0 ppb |
| MgO | 3.0 ppb |
| SafeCarb | 81.0 ppb |

To analyse the temperature stability of the Sample 1 formulation, a first portion of the fluid was hot rolled for 16 hours at 356° F., while a second portion was aged statically for 16 hours at 356° F., while a third portion was aged statically at 356° F. for 7 days. The rheology of the samples was measured with Fann 35 rheometer at a temperature of 120° F. as tabulated in Table 2.

TABLE 2

Rheology of Sample 1

| Rheology @ 120° F. | Fresh Fluid | After 16 hours hot rolled @ 356° F. | After 16 hours static aged @ 356° F. | After 7 days static aged @ 356° F. |
|---|---|---|---|---|
| 600 | 117 | 121 | 122 | 122 |
| 300 | 78 | 81 | 82 | 87 |
| 200 | 62 | 65 | 65 | 73 |
| 100 | 40 | 44 | 43 | 51 |
| 6 | 10 | 11 | 11 | 10 |
| 3 | 7 | 8 | 8 | 7 |

The fluid of Sample 1 that was hot rolled for 16 hours was also subjected to HTHP Fluid Loss testing and the results are shown in table 3 below.

TABLE 3

Fluid Loss of Sample 1

| Time (min) | New (ml) |
|---|---|
| Spurt | 2.5 |
| 15 | 4.0 |
| 30 | 5.2 |
| 60 | 6.5 |
| 960 (16-hr) | 18.0 |

In the following example, a wellbore fluid containing a branched and crosslinked AMPS acrylamide co-polymer was tested to determine its rheological properties and its stability at elevated temperatures. The wellbore fluid of Sample 2 was formulated as shown in Table 4. In Table 4, DEFOAM-X is a defoamer used for foam control and is available from MI-LLC (Houston, Tex.), ECF-1868 is a crosslinked AMPS acrylamide co-polymer available from MI-LLC (Houston, Tex.), SAFECARB is a calcium carbonate available from MI-LLC (Houston, Tex.) and is added to provide the fluid with bridging solids, PTS-200 is a pH-buffer and temperature stabilizer available from MI-LLC (Houston, Tex.), SAFE-SCAV NA is a liquid bisulfite-base additive available from MI-LLC (Houston, Tex.), SAFE-SCAV-HSW is an organic hydrogen sulfide scavenger and is available from MI-LLC (Houston, Tex.), CONQOR 303A is a corrosion inhibitor that is available from MI-LLC (Houston, Tex.), SP-101 is a sodium polyacrylate copolymer and is available from MI-LLC (Houston Tex.).

TABLE 4

Formulation of Sample 2

| Products | Concentration (Lb/bbl.) |
|---|---|
| Dry NaCl | 40.46 |
| Water | 286.37 |
| DEFOAM-X | 0.35 |
| ECF 1868 | 6.0 |
| PTS 200 | 3 |
| SAFE-SCAV NA | 0.1 |
| SAFE-SCAV HSW | 2 |
| CONQOR 303A | 2 |
| SAFECARB 2 | 26 |
| SAFECARB 10 | 24 |
| Barite | 80 |
| SP 101 | 0.1 |

To analyse the temperature stability of the Sample 2 formulation, a first portion of the fluid was hot rolled for 16 hours at 380° F., while a second portion was hot rolled for 3 days at 380° F., while a third portion was aged statically for 3 days at 380° F., while a fourth portion was aged statically at 380° F. for 6 days. The rheology of the samples was measured with Fann 35 rheometer at a temperature of 120° F. as tabulated in Table 5.

TABLE 5

Rheology of Sample 2

| | Temperature | | | | |
|---|---|---|---|---|---|
| | 120° F. | 120° F. | 120° F. | 120° F. | 120° F. |
| 600 rpm | 81 | 107 | 108 | 111 | 80 |
| 300 rpm | 56 | 76 | 77 | 77 | 56 |
| 200 rpm | 44 | 62 | 63 | 63 | 47 |
| 100 rpm | 30 | 44 | 45 | 45 | 33 |
| 6 rpm | 8 | 13 | 14 | 16 | 13 |
| 3 rpm | 7 | 11 | 11 | 14 | 11 |
| Gels 10", Lb/100 ft$^2$ | 7 | 10 | 10 | 12 | 10 |
| Gels 10', Lb/100 ft$^2$ | 7 | 11 | 10 | 13 | 11 |
| PV, cP | 25 | 31 | 31 | 34 | 24 |
| YP, Lb/100 ft$^2$ | 31 | 45 | 46 | 43 | 32 |
| pH | 9.46 | 9.30 | 9.30 | 9.20 | 9.20 |

In the following example, a coiled-tubing fluid containing a branched and crosslinked AMPS acrylamide co-polymer was tested to determine its rheological properties and its stability at elevated temperatures. The wellbore fluid of Sample 3 was formulated as shown in Table 6. In Table 6, DEFOAM-X is a defoamer used for foam control and is available from MI-LLC (Houston, Tex.), ECF-1868 is a crosslinked AMPS acrylamide co-polymer available from MI-LLC (Houston, Tex.), PTS-200 is a pH-buffer and temperature stabilizer available from MI-LLC (Houston, Tex.), DI-LOK is a fluid rheology stabilizer available from MI-LLC (Houston, Tex.).

TABLE 6

Formulation of Sample 3

| Products | Concentration |
|---|---|
| Dry NaCl | 87.5 ppb |
| Water | 0.871 bbl/bbl |
| DEFOAM-X | 0.3535 ppb |
| ECF 1868 | 8.0 ppb |

TABLE 6-continued

Formulation of Sample 3

| Products | Concentration |
|---|---|
| PTS 200 | 2.0 ppb |
| DI-LOK | 5.0 ppb |

To analyse the temperature stability of the Sample 3 formulation, a first portion of the fluid was hot rolled for 16 hours at 330° F., while a second portion was hot rolled for 48 hours at 330° F., while a third portion was aged statically for 16 hours at 330° F., while a fourth portion was aged statically at 330° F. for 48 hours. The rheology of the samples was measured with Fann 35 rheometer at a temperature of 120° F. as tabulated in Table 7.

TABLE 7

Rheology of Sample 3

| Fann-35 rheology @ 120° F. | Fresh Fluid | Hot rolled at 330° F. | | Static aged at 330° F. | |
|---|---|---|---|---|---|
| | | 16 hours | 48 Hours | 16 hours | 48 hours |
| 600 | 76 | 87 | 87 | 77 | 78 |
| 300 | 53 | 61 | 60 | 52 | 54 |
| 200 | 42 | 49 | 48 | 42 | 43 |
| 100 | 29 | 34 | 34 | 28 | 30 |
| 6 | 9 | 0 | 10 | 8 | 9 |
| 3 | 7 | 8 | 8 | 6 | 7 |
| PV | 23 | 26 | 27 | 25 | 24 |
| YP | 30 | 35 | 33 | 27 | 30 |
| pH | 9.22 | 9.29 | 9.26 | 9.42 | 9.21 |
| LSRV @ 0.0636 sec−1 @ 120° F. using Brookfield viscometer | 37199 | 35000 | 36492 | 30394 | 36292 |

The rheology of the fluid of Sample 3 that was hot rolled at 330° F. for 16 hours was measured with a Fann 35 and Grace rheometer at several temperatures as tabulated in Table 8 below.

TABLE 8

Rheology of Sample 3

| | 120° F. | | 200° F. | 250° F. | 300° F. | 330° F. |
|---|---|---|---|---|---|---|
| | Fann 35 | Grace | Grace | Grace | Grace | Grace |
| 600 | 87 | 89 | 62 | 51 | 45 | 39 |
| 300 | 61 | 62 | 42 | 35 | 31 | 27 |
| 200 | 49 | 49 | 34 | 28 | 24 | 26 |
| 100 | 34 | 34 | 23 | 19 | 17 | 15 |
| 6 | 10 | 10 | 8 | 6 | 5 | 7 |
| 3 | 8 | 8 | 6 | 5 | 5 | 7 |

In the following example, a wellbore fluid containing a branched and crosslinked AMPS acrylamide co-polymer was tested to determine its rheological properties and its stability at elevated temperatures. The wellbore fluid of Sample 4 was formulated as shown in Table 9. In Table 9, ECF-1868 is a crosslinked AMPS acrylamide co-polymer available from MI-LLC (Houston, Tex.), PTS-200 is a pH-buffer and temperature stabilizer available from MI-LLC (Houston, Tex.), SAFE-SCAV-HS is an organic hydrogen sulfide scavenger and is available from MI-LLC (Houston, Tex.), CALOTHIN is a liquid anionic acrylic copolymer that provides rheology control and is available from MI-LLC (Houston, Tex.), and POROSEAL is a copolymer filtration control additive available from MI-LLC (Houston, Tex.).

TABLE 9

Formulation of Sample 4

| Additives | Concentration |
|---|---|
| Water | 246.50 ppb |
| Soda Ash | 0.50 ppb |
| Sodium Chloride | 61.63 ppb |
| ECF-1868 | 5.0 ppb |
| PTS-200 | 3.0 ppb |
| SafeScav HS | 1.0 ppb |
| Calothin | 0.15 ppb |
| Poroseal | 10.50 ppb |
| Barite UF | 218.72 ppb |

To analyse the temperature stability of the Sample 4 formulation, a portion of the fluid was hot rolled for 16 hours at 420° F. The rheology of the sample was measured with Fann 35 rheometer at a temperature of 120° F. as tabulated in Table 10.

TABLE 10

Rheology of Sample 4

| Rheology @ 120° F. | Fresh Fluid | After 16 hours hot rolled at 420° F. |
|---|---|---|
| 600 | 72 | 74 |
| 300 | 48 | 49 |
| 200 | 35 | 36 |
| 100 | 24 | 25 |
| 6 | 8 | 7 |
| 3 | 6 | 6 |

Example 2—Viscosity Difference Between Linear and Crosslinked and Branched Polymer In this example, 2 wt. % of a co-polymer formed from an acrylamide monomer and a sulfonated anionic monomer was dispersed in 2 wt. % $CaBr_2$ salt solution and the viscosity was measured on a Brookfield viscometer. The results are shown in Table 18 below. In one sample the co-polymer was a linear co-polymer, while in the other sample the co-polymer was crosslinked and branched.

TABLE 11

Viscosity Results

| Polymer | 1.5 rpm | 6.0 rpm | 30.0 rpm | 60.0 rpm |
|---|---|---|---|---|
| Crosslinked and Branched | 3700 cps | 1350 cps | 480 cps | 320 cps |
| Linear Polymer | Too low to measure | Too low to measure | 78 cps | 74 cps |

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method of electrically logging a section of a wellbore, comprising:
   circulating a wellbore fluid within the wellbore, the wellbore fluid comprising:
      an aqueous base fluid; and
      a crosslinked and branched polymeric fluid loss control agent formed from at least an acrylamide monomer and a sulfonated anionic monomer;
      wherein the fluid loss control agent has an extent of crosslinking that is selected so that the fluid loss control agent has a viscosity that is within a peak viscosity response of a viscosity response curve, wherein the wellbore fluid exhibits a low end rheology that does not deviate by more than 30 percent under a temperature up to 300° F. when compared to low end rheology of the fluid at temperatures below about 250° F.;
   placing within the wellbore a wellbore logging tool capable of applying an electrical current to the wellbore;
   applying electrical current from the logging tool; and
   collecting an electrical log of the portion of the wellbore that has had electrical current applied thereto.

2. The method of claim 1, further comprising:
   moving the wellbore logging tool within the wellbore while continuously applying electrical current and collecting an electrical log.

3. The method of claim 1, further comprising:
   transmitting the electrical log to the surface.

4. The method of claim 1, wherein the acrylamide monomer is at least one selected from unsubstituted acrylamide, alkylacrylamides, N-methylol acrylamide, N-isopropyl acrylamide, diacetone-acrylamide, N-alkyl acrylamide, where alkyl is $C_1$ to $C_{14}$, N,N-dialkyl acrylamides, where alkyl is $C_1$ to $C_{14}$, N-cycloalkane acrylamides.

5. The method of claim 1, wherein the sulfonated anionic monomer is selected from 2-acrylamide-2-methyl-propanesulfonic acid, vinyl sulfonate, and styrene sulfonic acid.

6. The method of claim 1, wherein the wellbore fluid exhibits temperature stability up to 300° F.

7. The method of claim 1, wherein, after aging the wellbore fluid for at least 5 days at a temperature of at least 300° F., the wellbore fluid at 3 rpm, tested at 120° F., has a rheometer measured value of at least 5.

8. The method of claim 1, wherein the fluid loss control agent is present in the wellbore fluid at a concentration of about 0.5 to 15 lb/bbl.

9. The method of claim 1, wherein the fluid loss control agent has a percentage of intermolecular crosslinking that ranges from 0.25 to 10%.

10. The method of claim 1, wherein the peak viscosity response is defined as having an amount of crosslinker that correlates to the peak viscosity amount plus or minus the amount of crosslinker that correlates to up to 75% of the area under the viscosity response curve.

11. The method of claim 1, wherein the peak viscosity response is defined as having an amount of crosslinker that correlates to the peak viscosity amount plus or minus the amount of crosslinker that correlates to up to 75% of the area under the viscosity response curve.

12. The method of claim 1, wherein the electrical log consists of microresistivity measurement of one or more vertical segments of at least one selected from a wall of the wellbore and a formation structure associated with the wellbore.

13. A system for electrically logging a section of a wellbore, comprising:
   a wellbore containing a wellbore fluid, the wellbore fluid comprising:
      a base fluid; and
      a crosslinked and branched polymeric fluid loss control agent formed from at least an acrylamide monomer and a sulfonated anionic monomer;
      wherein the fluid loss control agent has an extent of crosslinking that is selected so that the fluid loss control agent has a viscosity that is within a peak viscosity response of a viscosity response curve, wherein the acrylamide monomer is at least one selected from unsubstituted acrylamide, alkylacrylamides, N-methylol acrylamide, N-isopropyl acrylamide, diacetone-acrylamide, N-alkyl acrylamide, where alkyl is $C_1$ to $C_{14}$, N,N-dialkyl acrylamides, where alkyl is $C_1$ to $C_{14}$, N-cycloalkane acrylamides, wherein the sulfonated anionic monomer is selected from 2-acrylamide-2-methyl-propanesulfonic acid, vinyl sulfonate, and styrene sulfonic acid, wherein, after aging the wellbore fluid for at least 5 days at a temperature of at least 300° F., wellbore fluid at 3 rpm, tested at 120° F., has a rheometer measured value of at least 5; and
   a wellbore logging tool capable of applying an electrical current to the wellbore.

14. The system of claim 13, further comprising:
   a cable attached to the wellbore logging tool, the cable being capable of suspending the tool within the wellbore; and
   a winch attached to the cable, the winch being capable of reversibly moving the wellbore logging tool, via the cable, vertically and horizontally within the wellbore.

15. The method of claim 13, wherein the wellbore fluid exhibits a low end rheology that does not deviate by more than 30 percent under a temperature up to 300° F. when compared to low end rheology of the fluid at temperatures below about 250° F.

16. The method of claim 13, wherein the fluid loss control agent is present in the wellbore fluid at a concentration of about 0.5 to 15 lb/bbl.

17. The method of claim 13, wherein the fluid loss control agent has a percentage of intermolecular crosslinking that ranges from 0.25 to 10%.

18. The system of claim 13, wherein the polymeric fluid loss control agent has an average molecular weight range from 250 Da to 1,000 kDa.

19. The system of claim 18, wherein a ratio of the acrylamide monomer to the sulfonated anionic monomer is from 0.5:1 to 10:1.

20. The system of claim 19, wherein the ratio is from 1:1 to 5:1.

21. A method of electrically logging a section of a wellbore, comprising:
   circulating a wellbore fluid within the wellbore, wherein the wellbore fluid comprises an aqueous base fluid and exhibits low end rheology that does not deviate by more than 30 percent under a temperature up to 300° F. when compared to low end rheology of the fluid at temperatures below about 250° F.;
   placing within the wellbore a wellbore logging tool capable of applying an electrical current to the wellbore;
   applying electrical current from the logging tool; and
   collecting an electrical log of the portion of the wellbore that has had electrical current applied thereto.

22. The method of claim 21, further comprising:
moving the wellbore logging tool within the wellbore while continuously applying electrical current and collecting an electrical log.
23. The method of claim 21, further comprising:
transmitting the electrical log to the surface.

\* \* \* \* \*